United States Patent
Jung

(10) Patent No.: US 7,580,083 B2
(45) Date of Patent: Aug. 25, 2009

(54) COLOR-FILTERLESS LCD

(75) Inventor: Il-yong Jung, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 11/477,403

(22) Filed: Jun. 30, 2006

(65) Prior Publication Data

US 2007/0040950 A1    Feb. 22, 2007

(30) Foreign Application Priority Data

Aug. 16, 2005    (KR)    ...................... 10-2005-0074929

(51) Int. Cl.
*G02F 1/1335*    (2006.01)

(52) U.S. Cl. ............................... 349/5; 349/57; 349/65; 349/95; 349/112

(58) Field of Classification Search ...................... 349/5, 349/57, 61, 62, 65, 95, 112, 115
See application file for complete search history.

(56) References Cited

U.S. PATENT DOCUMENTS

| | | | | |
|---|---|---|---|---|
| 5,626,409 | A * | 5/1997 | Nakayama et al. | ............. 353/31 |
| 6,151,166 | A * | 11/2000 | Matsushita et al. | .......... 359/566 |
| 6,174,060 | B1 * | 1/2001 | Imaoka et al. | ................. 353/31 |
| 6,678,023 | B1 * | 1/2004 | Yamazaki et al. | ............. 349/95 |
| 6,880,947 | B2 * | 4/2005 | Hsieh et al. | .................. 362/614 |
| 7,164,454 | B2 * | 1/2007 | Numata et al. | ................. 349/95 |
| 7,188,955 | B2 * | 3/2007 | Kang | ........................... 353/33 |
| 2004/0212748 | A1 * | 10/2004 | Suzuki et al. | .................. 349/8 |
| 2006/0098128 | A1 * | 5/2006 | Conner et al. | .................. 349/5 |

FOREIGN PATENT DOCUMENTS

| | | |
|---|---|---|
| JP | 06-222361 A | 8/1994 |
| JP | 09211453 A | 8/1997 |
| JP | 10-319217 A | 12/1998 |
| JP | 2001-235739 A | 8/2001 |
| JP | 2001-235740 A | 8/2001 |
| JP | 2004342429 A | 12/2004 |
| KR | 10-2003-0080764 A | 10/2003 |

* cited by examiner

*Primary Examiner*—Ellen Kim
(74) *Attorney, Agent, or Firm*—Sughrue Mion, PLLC

(57) ABSTRACT

A color-filterless liquid crystal display (LCD) device that can be employed not only in small size LCD units but also in large size LCD units is provided. The color-filterless LCD device includes a backlight unit which emits light; a light path converter which refracts light emitted from the backlight unit at an oblique angle; a color separation sheet facing the light path converter which separates the obliquely incident light into red, green, and blue light and emits the light at different exit angles; a liquid crystal panel including a liquid layer divided into a plurality of pixels; and an optical device sheet disposed on a lower surface of the liquid crystal panel and having a plurality of optical devices which focus the red, green, and blue light separated by the color separation sheet onto different pixels.

12 Claims, 4 Drawing Sheets

COLOR-FILTERLESS LCD

CROSS-REFERENCE TO RELATED PATENT APPLICATION

This application claims the benefit of Korean Patent Application No. 10-2005-0074929, filed on Aug. 16, 2005, in the Korean Intellectual Property Office, the disclosure of which is incorporated herein in its entirety by reference.

BACKGROUND OF THE INVENTION

1. Field of the Invention

Apparatuses consistent with the present invention relate to a color-filterless LCD device which can be employed not only in small size LCD units but also in large size LCD units.

2. Description of the Related Art

Conventional liquid crystal display (LCD) devices include an LCD unit and a backlight unit which uniformly illuminates the LCD with white light. Since the LCD unit simply transmits or blocks the white light generated in the backlight unit, color filters transmitting red (R), green (G), and blue (B) light are needed to realize color in the LCD device. However, each color filter filters only one of the red, green, and blue light that is transmitted by the LCD unit, and therefore has a transmission rate of only approximately 30%. Taking into account the light loss of other optical components, only 10% of the light emitted from the backlight unit is actually transmitted, and most of the light loss is due to the color filters. In addition, color realization differs prominently according to the quality the color filter.

To solve the problem, a color-filterless LCD device which does not need a color filter to realize color is provided. FIG. 1 illustrates a conventional color-filterless LCD device. Referring to FIG. 1, the conventional color-filterless LCD device includes a backlight unit 20, which emits light at different exit angles corresponding to wavelengths of the light, and an LCD unit 10, which includes an optical device which focuses a light of a predetermined wavelength on a predetermined pixel.

The backlight unit 20 includes a transparent light guide plate 21 having a plurality of light sources 22 arranged on a lateral side thereof and a color separation sheet 23 disposed on an upper surface of the transparent light guide plate 21. The color separation sheet transmits light at different exit angles according to wavelengths of light. The light sources 22 can be a plurality of light emitting devices (LEDs) respectively emitting red, green, and blue light, or a plurality of LEDs emitting white light arranged in a row. The color separation sheet 23 may be a diffraction screen sheet formed of periodically arranged diffraction screens in a sine wave form, prism form, or quadrangles.

The LCD display unit 10 includes a cylinder lens 11, a transparent plate 12, a liquid crystal panel 13 having a liquid layer divided into a plurality of pixels, a diffraction optical device 14 which transmits light in a vertical direction, and a transparent plate 15.

In the conventional color-filterless LCD device, light incident on a lateral side of the light guide plate 21 is totally reflected inside the light guide plate 21, and is incident on the upper surface of the light guide plate 21 at an oblique angle. A portion of the light obliquely incident on the upper surface of the light guide plate 21 is totally reflected again, and a portion of the rest of the light is transmitted from the upper surface of the light guide plate 21 by the color separation sheet 23 with different exit angles according to wavelengths of the light. For example, the green (G) light exits at an exit angle of 0°, the blue (B) light exits at an exit angle of −7.8°, and the red (R) light exits at an exit angle of 10.5°. Then, the light is incident on the cylinder lens 11. As illustrated in FIG. 1, three cylinder lenses 11 are disposed to correspond to three pixels of the liquid crystal panel 13. The convergence location of the incident light on the cylinder lens 11 differs according to the incident angle. Thus, as illustrated in FIG. 1, the green light is converged onto the pixel in the center, the blue light onto the pixel on the left in the drawing, and the red light onto the pixel on the right in the drawing. As each light of a different wavelength is incident on different pixels of the liquid crystal panel 13, color can be realized without color filters. Also, since light is incident on the liquid crystal panel 13 at an oblique angle, the light transmitted by the liquid crystal panel 13 is also emitted at an oblique angle. The diffraction optical device 14 emits light in a vertical direction and thus provides clearer images. The diffraction optical device 14 can be replaced with other optical devices having the same function, for example, a prism device.

As described above, such a conventional color-filterless LCD device does not need color filters and thus light loss is prevented. Accordingly, an LCD device with higher brightness is provided.

However, the color-filterless LCD devices in the prior art can only include edge type backlight units because the incident angle of incident light must be great enough for sufficient color separation by the color separation sheet 23. As illustrated in FIG. 2A, when an incident angle α of the incident light on the color separation sheet 23 is decreased, exit angles βB, βG, βR are increased and thus it is difficult to converge each color onto a desired location of a pixel in spite of color separation. To converge each color onto a desired location of a pixel, the exit angle of the green light is preferably 0°, and the red and blue light may have approximately symmetric exit angles to one another. For example, the red and blue light should have exit angles such as −10° for the red light and +10° for the blue light, or −8° for the red light and +8° for the blue light. For this purpose, it is advantageous that the incident angle α is as large as possible. For example, as illustrated in FIG. 2B, while dependant on the pattern of the color separation sheet 23, when the incident angle is approximately 70°, it satisfies the above described conditions. To obtain such a large incident angle, an edge type backlight unit was used for a conventional color-filterless LCD device. However, an edge type backlight unit can be used only in small size displays, and a direct type backlight unit is used in middle and large size displays. Accordingly, color-filterless LCD devices are employed in small size LCD devices.

SUMMARY OF THE INVENTION

Exemplary embodiments of the present invention provide a color-filterless liquid crystal display (LCD) device which can be employed in small size display units as well as in large size display units.

According to an exemplary embodiment of the present invention, there is provided a color-filterless liquid crystal display (LCD) device comprising: a backlight unit which emits light; a light path converter which refracts light emitted from the backlight unit and emits light at an oblique angle; a color separation sheet facing the light path converter which separates incident light into red, green, and blue light emitted at different exit angles; a liquid crystal panel comprising a liquid crystal layer divided into a plurality of pixels; and an optical device sheet, disposed on a lower surface of the liquid crystal panel, comprising a plurality of optical devices which focus each of the red, green, and blue light emitted by the color separation sheet onto different pixels of the liquid crystal panel.

According to an exemplary aspect of the present invention, the light path converter may comprise a plurality of juxtaposed prism patterns protruding toward the backlight unit.

The prism patterns may comprise first vertical surfaces and second inclined surfaces and the second inclined surfaces may refract the light incident thereon.

An exit angle of the light emitted from the light path converter may range from approximately 50° to 70°.

According to an embodiment of the present invention, the backlight unit may be an edge type backlight unit.

According to another embodiment of the present invention, the backlight unit may be a direct type backlight unit.

The color separation sheet may be a diffraction screen sheet comprising a plurality of diffraction screens periodically arranged and facing the liquid crystal panel.

Among the red, green, and blue light separated by the color separation sheet, green light may have an exit angle of 0°, and the red and blue light may have exit angles symmetric to each other around the green light.

The light path converter and the color separation sheet may be formed in a single body. That is, the light path converter may be disposed on a lower surface of a transparent plate, and the color separation sheet may be formed on an upper surface of the transparent plate.

The plurality of optical devices may comprise a plurality of cylinder lens devices arranged side by side.

Each of the plurality of cylinder lens devices may be disposed to correspond to three pixels of the liquid crystal panel.

The color-filterless liquid crystal display apparatus according to the present invention may further comprise a diffraction optical device, disposed on an upper surface of the liquid crystal panel, which emits light transmitted through the liquid crystal panel in a vertical direction.

BRIEF DESCRIPTION OF THE DRAWINGS

The above and other exemplary aspects and features of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 1:
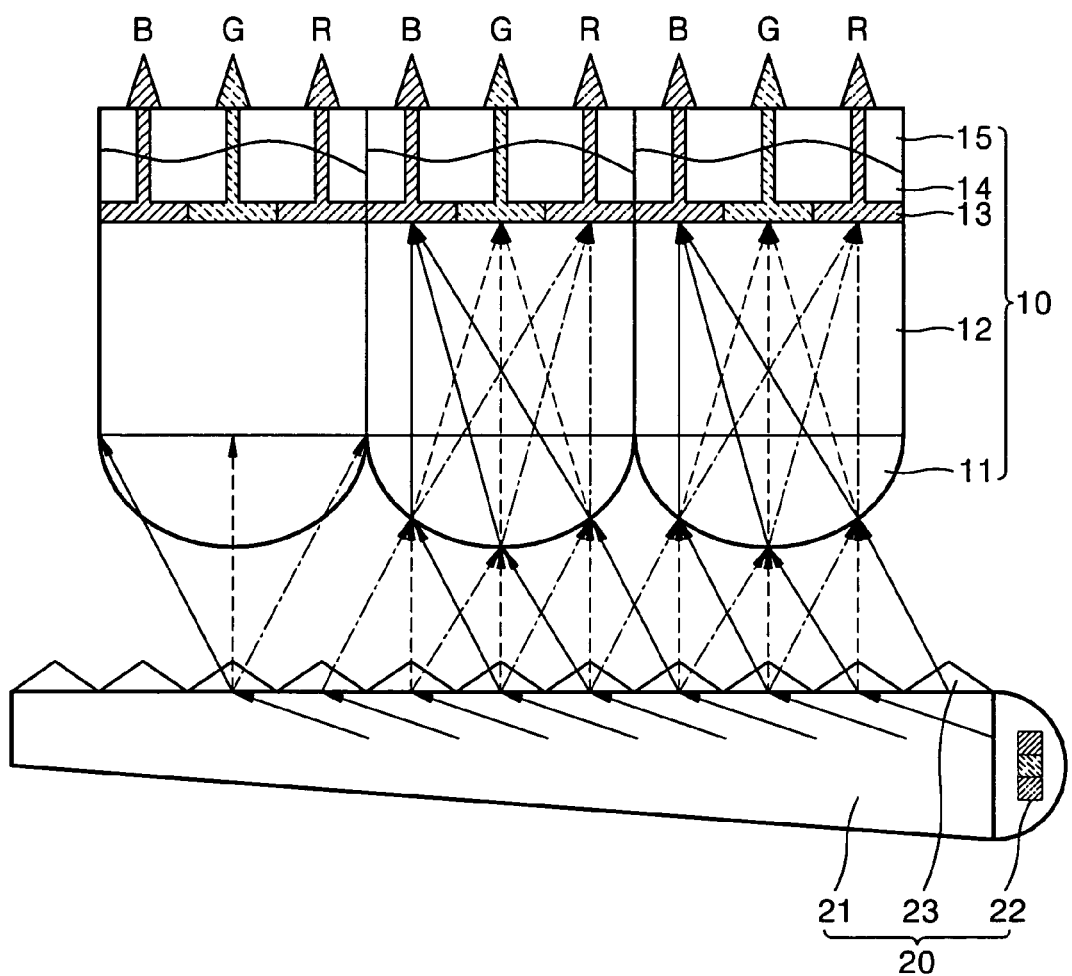
FIG. 1 is a schematic view of a conventional color-filterless liquid crystal display (LCD) device.
Figure 2A:
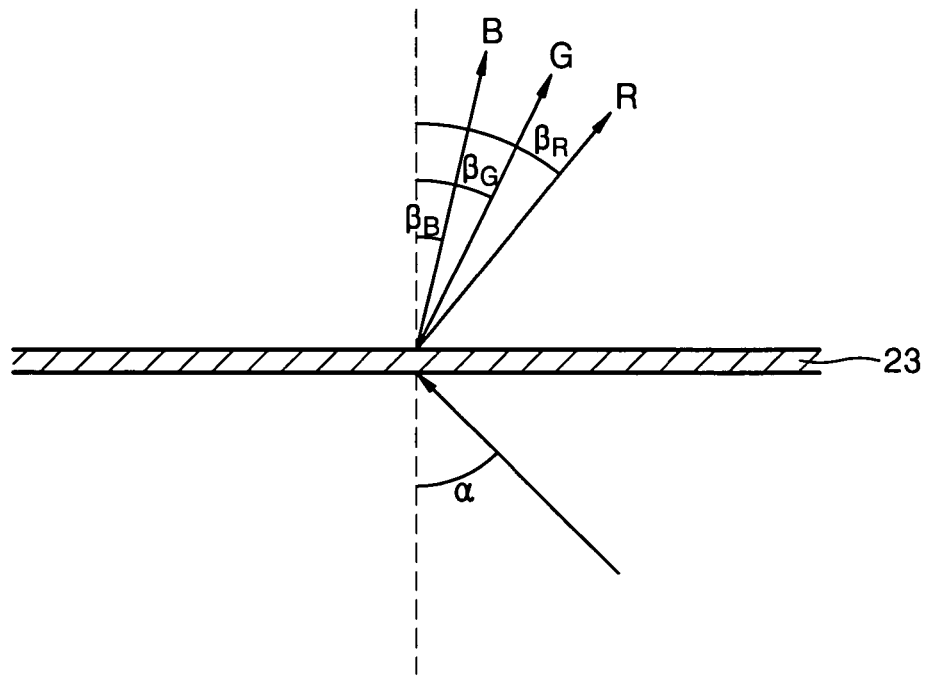
FIG. 2A illustrates exit angles of light incident on a diffraction screen according to wavelengths of the light.
Figure 2B:
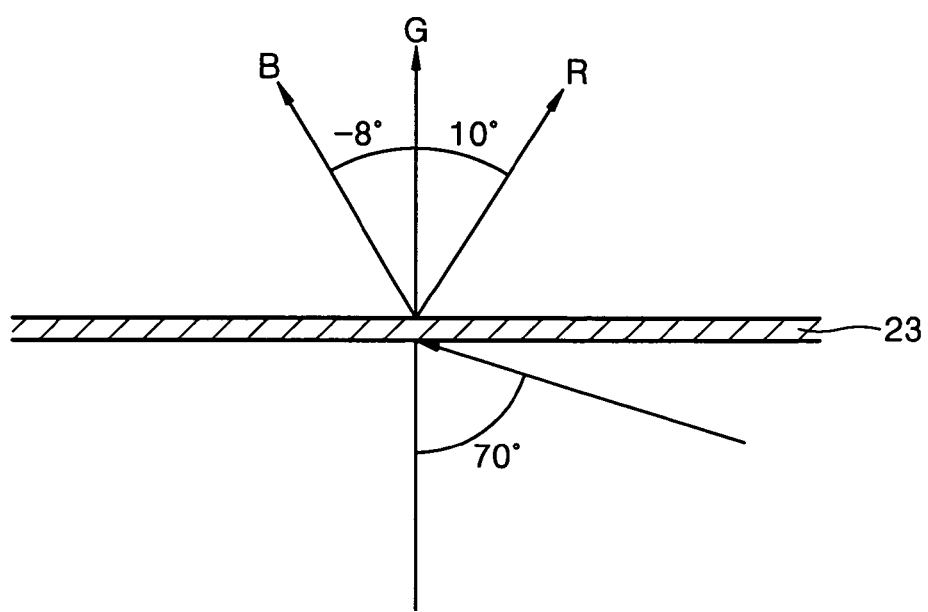
FIG. 2B illustrates an incident angle of green light and exit angles of red and blue light when the green light has an exit angle of 0° in a diffraction screen.
Figure 3:
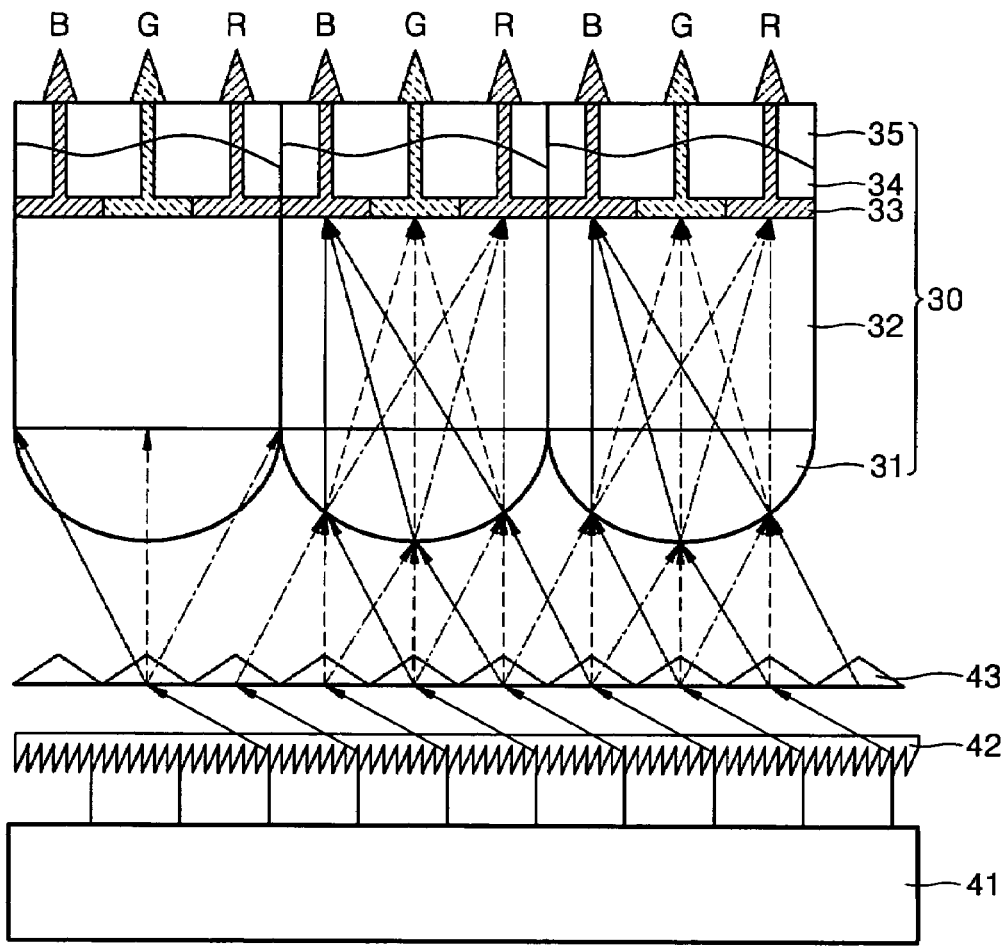
FIG. 3 is a cross-sectional view of a structure of a color-filterless LCD device according to an exemplary embodiment of the present invention.

FIG. 3 is a cross-sectional view of a structure of a color-filterless liquid crystal display (LCD) device according to an exemplary embodiment of the present invention. As illustrated in FIG. 3, a color-filterless LCD device includes: a backlight unit 41 which emits white light; a light path converter 42 which modifies an angle at which the light is emitted from the backlight unit 41; a color separation sheet 43, facing the light path converter 42, which separates the obliquely incident light into red, green, and blue light emitted at different exit angles; a liquid crystal panel 33 including a liquid crystal layer divided into a plurality of pixels; a transparent plate 32 disposed on a lower surface of the liquid crystal panel 33; a plurality of optical devices 31, disposed on a lower surface of the transparent plate 32, which focus the red, green, and blue light separated by the color separation sheet 43 on different pixels of the liquid crystal panel 33; a diffraction optical device 34 which transmits light from the liquid crystal panel 33 in a vertical direction; and a transparent substrate 35 disposed on the diffraction optical device 34. The liquid crystal panel 33, the transparent substrate 32, the optical devices 31, the diffraction optical device 34, and the transparent substrate 35 form an LCD unit 30.

The backlight unit 41 may be a direct backlight unit in which a plurality of light emitting devices (LEDs) or laser diodes (LDs) are arranged in two dimensions. Furthermore, the backlight unit 41 may be an edge backlight unit with a plurality of LEDs or LDs disposed on a lateral side of a light guide plate or a cold cathode fluorescent lamp as in the conventional color-filterless LCD device.

The light path converter 42 changes the angle of light emitted from the backlight unit 41 to be incident on the color separation sheet 43 at an optimal angle. When a direct backlight unit is used, the light path converter 42 refracts vertical white light to be incident on the color separation sheet 43. When an edge type backlight unit is used, the angle of the obliquely incident white light is increased for the white light to be incident on the color separation sheet 43. Although dependant on the pattern of the color separation sheet 43, the exit angle of the white light emitted from the light path converter 42 may range from approximately 50° to 70°.

Figure 4:
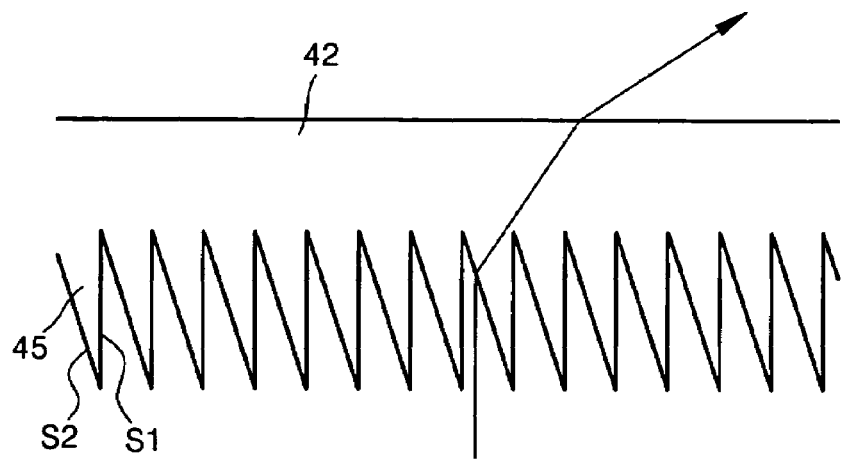
FIG. 4 illustrates a light path converter according to an exemplary embodiment of the present invention and the principle of light refraction.
Figure 5:
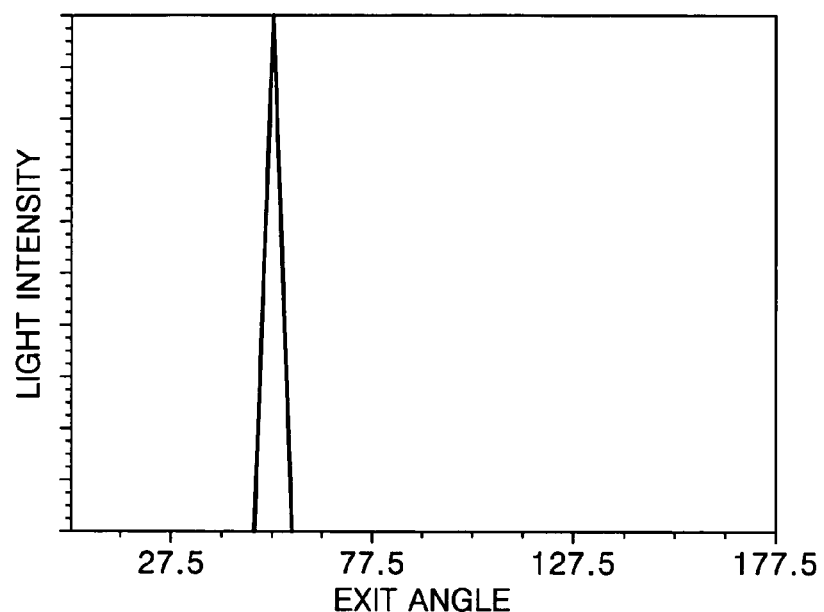
FIG. 5 is a graph illustrating light exit distribution according to the light path converter of FIG. 4 according to an exemplary embodiment of the present invention.

FIG. 4 illustrates a light path converter according to an exemplary embodiment of the present invention and the principle of light refraction. As illustrated in FIG. 4, the light path converter 42 can be a prism sheet having a plurality of juxtaposed prism patterns 45 protruding towards the backlight unit 41. The prism patterns 45 have vertical first surfaces S1 and inclined second surfaces S2. In this configuration, the light vertically emitted from the backlight unit 41 is incident on the light path converter 42 via the inclined second surfaces S2. The light incident on the second surfaces S2 is first refracted by the inclined second surfaces S2, and then refracted again and emitted from the upper surface of the light path converter 42 at a predetermined angle. The proceeding angle of the light emitted from the light path converter 42 can vary depending on the prism patterns 45. For example, when the distance between the prism patterns 45 is 50 μm and the height of the prism patterns is 150 μm, as illustrated in FIG. 5, the white light which is vertically incident on the prism patterns 45 of the light path converter 42 has an exit angle distribution ranging from approximately 50° to 55°, and has the largest distribution at an angle of 52.5°. The prism patterns 45 can be modified in accordance with the optimal incident angle in the color separation sheet 43 and angle distribution of the white light emitted from the backlight unit 41.

The color separation sheet 43 disposed facing the light path converter 42 separates white light obliquely incident thereon into red, green, and blue light emitted at different exit angles. The color separation sheet 43 may be a diffraction screen sheet having diffraction screens periodically arranged in the form of sine waves, prisms, or quadrangles. Of the red, green, and blue light separated by the color separation sheet 43, the green (G) light may have an exit angle of 0°, and the red (R) and blue (B) light may have exit angles substantially symmetric to each other around the green light.

Figure 6:
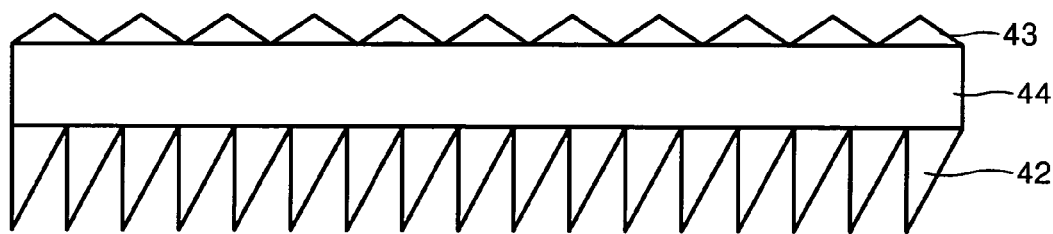
FIG. 6 is a cross-sectional view of a sheet of prism patterns and diffraction screens constituted in a single body according to an exemplary embodiment of the present invention.

In the current embodiment of the present invention, the light path converter 42 and the color separation sheet 43 can be constructed as, a single body using a single material. For example, as illustrated in FIG. 6, the light path converter 42 may be formed on a lower surface of a transparent plate 44 formed of glass or plastic, and the color separation sheet 43 may be formed on an upper surface of the transparent plate 44.

Referring to FIG. 3 again, a transparent plate 32 disposed on a lower surface of the liquid crystal panel 33 and a plurality of optical devices 31 disposed on a lower surface of the transparent plate 32 can be formed as a single body. As illustrated in FIG. 3, the optical devices 31 focus the red, green, and blue light separated by the color separation sheet 43 to different pixels of the liquid crystal panel 33. For this purpose, for example, the optical devices 31 can be a plurality of cylinder lens devices arranged side by side. That is, the optical device sheet may be a cylinder lens sheet having a plurality of long cylinder lens devices juxtaposed on its surface. A cylinder lens device, as illustrated in FIG. 3, can be disposed to correspond to three pixels of the liquid crystal panel 33 and can distribute the red, green, and blue light to each of the three pixels.

Also, as in the prior art, the diffraction optical device 34 allows light that is transmitted through the liquid crystal panel 33 to proceed vertically and provides improved image quality for viewers. However, other optical devices which have the same function as diffraction optical devices such as prism devices can be used in place of diffraction optical devices, or can be omitted at certain occasions.

Hereinafter operations of the color-filterless LCD device will be described.

First, white light emitted from the backlight unit 41 is incident on the light path converter 42 such as a prism pattern sheet. When the backlight unit 41 is a direct backlight unit type, the white light is incident vertically on the light path converter 42. The white light incident on the light path converter 42, as illustrated in FIG. 4, is refracted at an exit surface of the light path converter 42 and emitted at a predetermined angle. For example, the exit angle of the white light emitted from the exit surface of the light path converter 42 may range from 50° to 70°.

The white light emitted from the light path converter 42 is incident on the color separation sheet 43 at an oblique angle. As described above, the color separation sheet 43 separates incident white light thereon into red, green, and blue light and emits the light at different exit angles. The exit angles of the red, green, and blue light emitted from the color separation sheet 43 can be determined by the angle at which the white light is incident on the color separation sheet 43. For example, when white light is incident at an angle of approximately 70°, the green light is emitted at approximately 0°, the blue light is emitted at approximately −7.8°, and the red light is emitted at approximately 10.5°.

Then, each of the red, green, and blue light is incident on the optical devices 31 such as a cylinder lens formed on the lower surface of the transparent plate 32. As illustrated in FIG. 3, an optical device 31 is disposed to correspond to the three pixels of the liquid crystal panel 33. Since the convergence location of the incident light on the optical devices 31 differs according to the incidence location and incident angle, as illustrated in FIG. 3, the green light is converged onto the pixel in the center of the three pixels; the blue light onto the pixel on the left in the drawing, and the red light onto the pixel on the right in the drawing. As the light of different colors is separately incident on different pixels of the liquid crystal panel 33, color realization is possible without color filters. Finally, the light that is transmitted through the liquid crystal panel 33 is emitted in the perpendicular direction thereto by the diffraction optical device 34 and passes through the transparent plate 35.

As described above, in the color-filterless LCD device of the present invention, a backlight unit can be a direct type backlight unit unlike conventional color-filterless LCD devices. A typical direct type backlight unit may comprise a plurality of light sources such as LEDs arranged on a base substrate in two dimensions. The typical direct backlight unit thereby emits light uniformly through a diffusion substrate. Large size direct type backlight units can be manufactured in larger sizes as compared to edge type backlight units in which light sources are arranged on a lateral side of the light guide plate. Accordingly, a color-filterless LCD device of the present invention can be employed not only in small size but also in large size LCD units.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A color-filterless liquid crystal display (LCD) device comprising:
   a backlight unit which emits white light;
   a light path converter which refracts white light emitted from the backlight unit and emits white light at an oblique angle;
   a color separation sheet facing the light path converter which separates the obliquely incident white light into red, green, and blue light; wherein the emission angles of each of the red, green, and blue light are different;
   a liquid crystal panel comprising a liquid crystal layer divided into a plurality of pixels; and
   an optical device sheet, disposed on a lower surface of the liquid crystal panel, comprising a plurality of optical devices which focus each of the red, green, and blue light emitted form the color separation sheet onto different pixels of the liquid crystal panel,
   wherein the light path converter comprises a plurality of juxtaposed prism patterns protruding toward the backlight unit.

2. The color-filterless LCD device of claim 1, wherein the prism patterns comprise first vertical surfaces and second inclined surfaces and the second inclined surfaces refract the light incident thereon.

3. The color-filterless LCD device of claim 1, wherein an exit angle of the light emitted from the light path converter ranges from 50° to 70°.

4. The color-filterless LCD device of claim 1, wherein the backlight unit is an edge type backlight unit.

5. The color-filterless LCD device of claim 1, wherein the backlight unit is a direct type backlight unit.

6. The color-filterless LCD device of claim 1, wherein the color separation sheet is a diffraction screen sheet comprising a plurality of diffraction screens periodically arranged and facing the liquid crystal panel.

7. The color-filterless LCD device of claim 6, wherein of the red, green, and blue light separated by the color separation sheet, the green light has an exit angle of 0°, and the red and the blue light have exit angles symmetric to each other on either side of the green light.

8. The color-filterless LCD device of claim 6, wherein the light path converter and the color separation sheet are formed in a single body.

9. The color-filterless LCD device of claim 8, further comprising:
   a transparent plate;
   wherein the light path converter is disposed on a lower surface of the transparent plate, and the color separation sheet is formed on an upper surface of the transparent plate.

10. The color-filterless LCD device of claim 1, wherein the plurality of optical devices comprise a plurality of cylinder lens devices arranged side by side.

11. The color-filterless LCD device of claim 10, wherein each of the plurality of cylinder lens devices corresponds to three pixels of the liquid crystal panel.

12. The color-filterless LCD device of claim 1, further comprising:
   a diffraction optical device, disposed on an upper surface of the liquid crystal panel, which emits light transmitted through the liquid crystal panel in a vertical direction.

* * * * *

UNITED STATES PATENT AND TRADEMARK OFFICE
CERTIFICATE OF CORRECTION

PATENT NO. : 7,580,083 B2
APPLICATION NO. : 11/477403
DATED : August 25, 2009
INVENTOR(S) : Il-yong Jung It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Fourteenth Day of September, 2010

David J. Kappos
*Director of the United States Patent and Trademark Office*